United States Patent
Knezevic et al.

(10) Patent No.: US 8,725,440 B2
(45) Date of Patent: May 13, 2014

(54) METHOD AND APPARATUS FOR PROCESSING A MOTOR SIGNAL, HAVING CURRENT RIPPLE, OF A DC MOTOR

(75) Inventors: Jovan Knezevic, Bamberg (DE); Wolfgang Uebel, Weitramsdorf (DE); Thorsten Fuchs, Hallstadt (DE); Detlef Russ, Ebersdorf (DE); Stefan Diestler, Unterleinleiter (DE)

(73) Assignee: Brose Fahrzeugteile GmbH & Co., KG., Hallstadt, Hallstadt (DE)

( * ) Notice: Subject to any disclaimer, the term of this patent is extended or adjusted under 35 U.S.C. 154(b) by 543 days.

(21) Appl. No.: 13/061,765

(22) PCT Filed: Aug. 18, 2009

(86) PCT No.: PCT/EP2009/005965
§ 371 (c)(1),
(2), (4) Date: May 10, 2011

(87) PCT Pub. No.: WO2010/028736
PCT Pub. Date: Mar. 18, 2010

(65) Prior Publication Data
US 2011/0270558 A1    Nov. 3, 2011

(30) Foreign Application Priority Data

Sep. 12, 2008 (DE) .......................... 10 2008 047 094
Mar. 20, 2009 (DE) .......................... 10 2009 014 264

(51) Int. Cl.
*G01R 25/00* (2006.01)
*G01R 27/00* (2006.01)
*G01R 15/00* (2006.01)
*G05F 1/10* (2006.01)
*H02P 7/288* (2006.01)

(52) U.S. Cl.
USPC .............................. 702/65; 702/57; 388/815

(58) Field of Classification Search
USPC ....................................... 702/65, 57; 388/815
See application file for complete search history.

(56) References Cited

U.S. PATENT DOCUMENTS

| 5,048,115 A | * | 9/1991 | Venturino | ...................... 388/815 |
| 2002/0026267 A1 | * | 2/2002 | Kifuku | ........................... 701/41 |
| 2003/0111995 A1 | | 6/2003 | Otte | |
| 2004/0098213 A1 | | 5/2004 | Gerlach | |
| 2008/0100245 A1 | | 5/2008 | Turner | |

FOREIGN PATENT DOCUMENTS

DE    19511307 C1    1/1997

OTHER PUBLICATIONS

International Search Report dated Oct. 3, 2010 for Publication No. WO 2010/028736 (8 pages).
International Preliminary Report on Patentability and Written Opinion for PCT/EP2009/005965 (Application Filing Date: Aug. 18, 2009) Mailing Date: Mar. 24, 2011 (8 pages).

* cited by examiner

*Primary Examiner* — John Breene
*Assistant Examiner* — Manuel Rivera Vargas
(74) *Attorney, Agent, or Firm* — Mendelsohn, Drucker & Dunleavy, P.C.; Steve Mendelsohn

(57) ABSTRACT

In order to process a motor signal ($I_a$, $U_m$) of a DC motor (4), in particular of an adjustment drive of a motor vehicle, the armature current ($I_a$) and the motor voltage ($U_m$) of the DC motor (4) are detected and used for determining the back-emf (E) of the DC motor (4), wherein the determined back-emf (E) is used to generate a useful signal ($S_f$, $S_{EFL}$), which is in particular speed-proportional, from the armature current signal ($I_a$) for position sensing or for evaluating an excess force limitation.

21 Claims, 4 Drawing Sheets

METHOD AND APPARATUS FOR PROCESSING A MOTOR SIGNAL, HAVING CURRENT RIPPLE, OF A DC MOTOR

BACKGROUND

1. Field of the Invention

The invention relates to a method and an apparatus for processing a motor signal of a DC motor, with a controllable frequency filter, which generates a speed-proportional output signal using the ripple contained in the armature current of the DC motor.

2. Description of the Related Art

A DC motor, which is also referred to as a commutator motor, is a permanent magnet electric motor, whose motor or armature current, as a result of the commutation, contains an AC component, also referred to as current ripple, which is superimposed on a DC component. Such a DC motor is in particular also used in an adjustment drive, for example in a window winder drive, a sunroof drive or a tailgate drive, of a motor vehicle. In this application, it is particularly important to enable, using simple means, reliable determination of the motor or armature position and therefore precise position determination of the motor-driven adjustment part (actuating element).

The frequency of the current ripple is dependent on the number of commutator or collector laminates of the motor armature. Therefore, it is possible to draw a conclusion, on the basis of the number of current ripple elements in a time interval, both on the rotary position of the motor, and therefore on the position of an adjustment part driven thereby, and on the motor speed, using the frequency (ripple frequency) of the current ripple signal. However, in particular high-frequency interference signals are superimposed on the motor signal and therefore the useful signal containing the current ripple. Comparatively low-frequency interference which has an effect on the profile of the DC signal component on which the current ripple is superimposed and can be attributed substantially to the force or torque profile of the motor, which fluctuates in operationally dependent fashion, also needs to be taken into consideration in the evaluation of the current ripple.

In a circuit arrangement for generating a speed-proportional pulse train in DC commutator motors which is known from DD 254 254 A1, a motor signal which is tapped off at a current-to-voltage converter in the form of a nonreactive resistance, is supplied to a voltage-controlled high-pass filter and to a voltage-controlled low-pass filter, connected downstream, for realizing a narrow-band bandpass filter, with a speed-proportional pulse train being generated at the output thereof.

It is furthermore known from U.S. Pat. No. 4,924,166 to use, as controllable filter, a phase locked loop with a phase comparator and a controllable oscillator (VCO) connected downstream thereof via a low-pass filter to process the current ripple generated in the armature current of a DC motor. On the input side, the motor signal filtered using a low-pass filter is supplied to the phase comparator, while the oscillator thereof is driven by a signal derived from the electromotive force (EMF). For this purpose, the armature current signal tapped off at a shunt is supplied directly via a low-pass filter to the signal input of the phase locked loop, while the control signal for the oscillator is supplied to the phase locked loop from the difference between the motor voltage and the product of the armature resistance and the armature current as so-called back-emf signal (back-electromotive force).

It is also known from DE 195 11 307 C1 to drive an adjustable bandpass filter using the back-emf which is determined from the detected motor voltage and the detected armature current. Otherwise, in this known method, the frequency filtering is adjusted by estimating the present useful frequency (ripple frequency) of the armature current signal in such a way that the passband comprises the useful frequency and is above and/or below the interference frequencies. The relative extreme values (minimum and maximum evaluation) are determined from the signal filtered in this way.

Even in a method for determining the number of motor revolutions in electric motors from current ripple which is known from DE 198 34 108 A1, the motor current signal is first supplied to a low-pass filter in order to eliminate high-frequency interference. The current ripple is in turn determined using calculated differential values between successive minimum and maximum values of the motor current signal filtered using a low-pass filter.

In a circuit arrangement for detecting a speed-proportional pulse train for a DC commutator motor as known from EP 0 579 015 B1, a frequency-selective filter with a limit frequency which varies corresponding to the motor speed is provided. In this case, the lower frequency, given virtually unchanged motor speed, is markedly below, but, in the event of a change in the speed, is approximately in the range of the pulse train. It should thus be possible to achieve temporarily a differentiating response of the bandpass filter during changes in speed and therefore also to precisely determine the rotary position of the DC commutator motor during these changes.

In order to configure a frequency filter variably, it is known from EP 1 037 052 B1 (DE 600 05 727 T2), to use an active high-pass filter with switched capacitances (switched-capacitor filter, CR filter) in order to eliminate interference from the motor signal and to determine the speed from the ripple of a DC motor. For this purpose, capacitances are switched by means of a clock signal, with the result that the filter cut-off frequency changes and a downstream circuit generates a ripple pulse train, which also acts as a basis for the generation of the clock signal.

SUMMARY

The invention is based on the object of specifying a particularly suitable method for processing a motor signal (motor or armature current, motor voltage) of a DC motor. A signal which is as free of interference as possible and is in particular speed-proportional is also intended to be generated. This signal is intended to be suitable for position determination for an adjustment device of a motor vehicle and/or for excess force limitation in an anti-trap system. Furthermore, a suitable apparatus for processing such a motor signal is specified.

As regards the method, this object is achieved according to the invention by the features of claim 1. In this regard, the armature current or an armature current signal of the DC motor is detected and used for determining the back-emf of the DC motor. In addition, in order to determine the back-emf of the DC motor, additionally the motor voltage is detected or a corresponding motor voltage signal is generated. The determined back-emf is used to generate a useful signal, which is in particular speed-proportional, from the armature current signal.

In accordance with one variant of the invention, the armature current signal of the DC motor is supplied to a controllable filter module, i.e. one which can be determined with respect to its frequency response or limit frequency or mid-frequency. The frequency filter, which is effective, for example, as a variable bandpass filter, generates a speed-proportional output signal using the current ripple contained in the armature current or in a corresponding armature current signal.

On the control side, a speed-proportional control signal determined from the back-emf is supplied to the frequency filter and, on the signal input side, a filter input signal is supplied to said frequency filter. The filter input signal is derived from the armature current signal containing the current ripple and the motor voltage signal, which is weighted with a low-pass filter characteristic, preferably with a first-order low-pass filter functionality.

The back-emf is determined from the detected motor voltage and the product determined from the armature current signal and the armature resistance. The filter input signal is formed from the difference between the armature current signal (minuend) and a subtrahend derived from a mathematical motor model. Once the motor voltage has been switched on or applied, said subtrahend increases over time with said motor voltage to a current value which is proportional to the product of the inverse value of the armature resistance or armature winding resistance and the motor voltage with a (first order) delay, with the time constant being given by the induction and the inverse value of the winding resistance. This response corresponds to the function of a first-order low-pass filter.

In a suitable manner, the useful signal is supplied to a low-pass filter. Said low-pass filter can be in the form of a digital filter with a fixed limit frequency. In accordance with a variant of the invention which is directed to excess force limitation, the corresponding low-pass filter is additionally used for attenuating high-frequency interference, even for removing the high-frequency ripple.

The change in speed is used for (speed) excess force limitation (speed EFL), in particular as input variable of a function module for speed difference determination. In a suitable manner, the first derivative of the back-emf is used for the calculation. By suitably evaluating ripple events, it is also possible for the formation or calculation of the derivative to be performed or used in such a way that any ripple still present in the signal is removed.

For this purpose, in a suitable manner, the differentiation is not performed using two adjacent pairs of values, but preferably always at a distance of a number n of ripple elements, where n corresponds to the number of commutator slots. In this case, the following apply for a sampled value:

$$u1 = E_{ripple\_n} \sin(2\pi f t) + E_1$$

$$u2 = E_{ripple\_n} \sin(2\pi f t + \phi) + E_2$$

for $\phi = 2\pi n$ $$\Delta E = u2 - u1$$

$$\Delta E = E_2 - E_1$$

As a result, the fluctuations in the back-emf E which are brought about by the AC component of the ripple are removed.

In an expedient development of the variant for processing the motor or armature current signal for position determination with a controllable frequency filter, the useful signal is not supplied directly to said frequency filter, but likewise after previous low-pass filtering in the form of a control signal filtered using a low-pass filter. The low-pass filtering of the control signal serves the purpose of smoothing said control signal for the frequency matching and therefore of stabilizing the frequency filter, which is in the form of a bandpass filter, for example.

In a suitable manner, the armature current signal is prefiltered in a low-pass filter. As a result, the high frequency components responsible for the so-called alias effect are attenuated. A corresponding analog low-pass filter is therefore arranged upstream of the further processing of the armature current signal for generating both the filter input signal and the control signal of the frequency filter.

As regards the apparatus, the mentioned object is achieved according to the invention by the features of claim 12. Advantageous configurations and variants are the subject matter of the dependent claims referring back to said claim.

Thus, the apparatus comprises in particular a device for detecting the profile of the armature current as armature current signal and the motor voltage (motor voltage signal). Furthermore, the apparatus comprises a frequency filter with a signal input and a signal output and with a control input. A first function module is arranged upstream of the control input and determines a speed-proportional control signal. A second function module with a low-pass filter function is arranged upstream of the signal input of the frequency filter. This low-pass filter function on the signal input side is calculated from the detected motor voltage and from the self-inductance and the mutual inductance of the DC motor using a motor model.

In order to determine the filter input signal, the difference is formed from the detected armature current and a signal containing the low-pass filter function. The filter input signal is in this case proportional to the back-emf, with the result that interference frequencies generated in particular as a result of inrush current peaks are filtered out of the filter input signal or at least attenuated. Such high-frequency interference components as a result of switching operations, in particular with inrush current peaks during switching of the DC motor, have until now resulted in considerable problems in the filtering of the current ripple during the start phase of the DC motor or in the case of similar high-frequency voltage interference.

The functionality of the second function module which is arranged upstream of the controllable frequency filter on the signal side is suitably the functionality of a first-order low-pass filter, which is derived from the mathematical motor model using the electrical equation of the DC motor in accordance with the relationship $U_m = R_a \times I_a + L_a \times dI_a/dt + E$. In this case, $U_m$ is the motor voltage, $R_a \times I_a$ is the product of the armature resistance and the armature current of the DC motor, $L_a \times dI_{a/dt}$ is the self-inductance (self-induced voltage) with the winding inductance $L_a$ and $\Delta E$ is the mutual inductance (back-emf) of the DC motor. This relationship is used to calculate the correction value or the subtraction value of the current profile subtracted from the armature current signal, which current profile corresponds to the product of a factor characterizing the low-pass filter functionality and the motor voltage.

BRIEF DESCRIPTION OF THE DRAWINGS

Exemplary embodiments of the invention will be explained in more detail below with reference to a drawing, in which.

Mutually corresponding parts have been provided with the same reference symbols in all of the figures.

DETAILED DESCRIPTION

Figure 1:
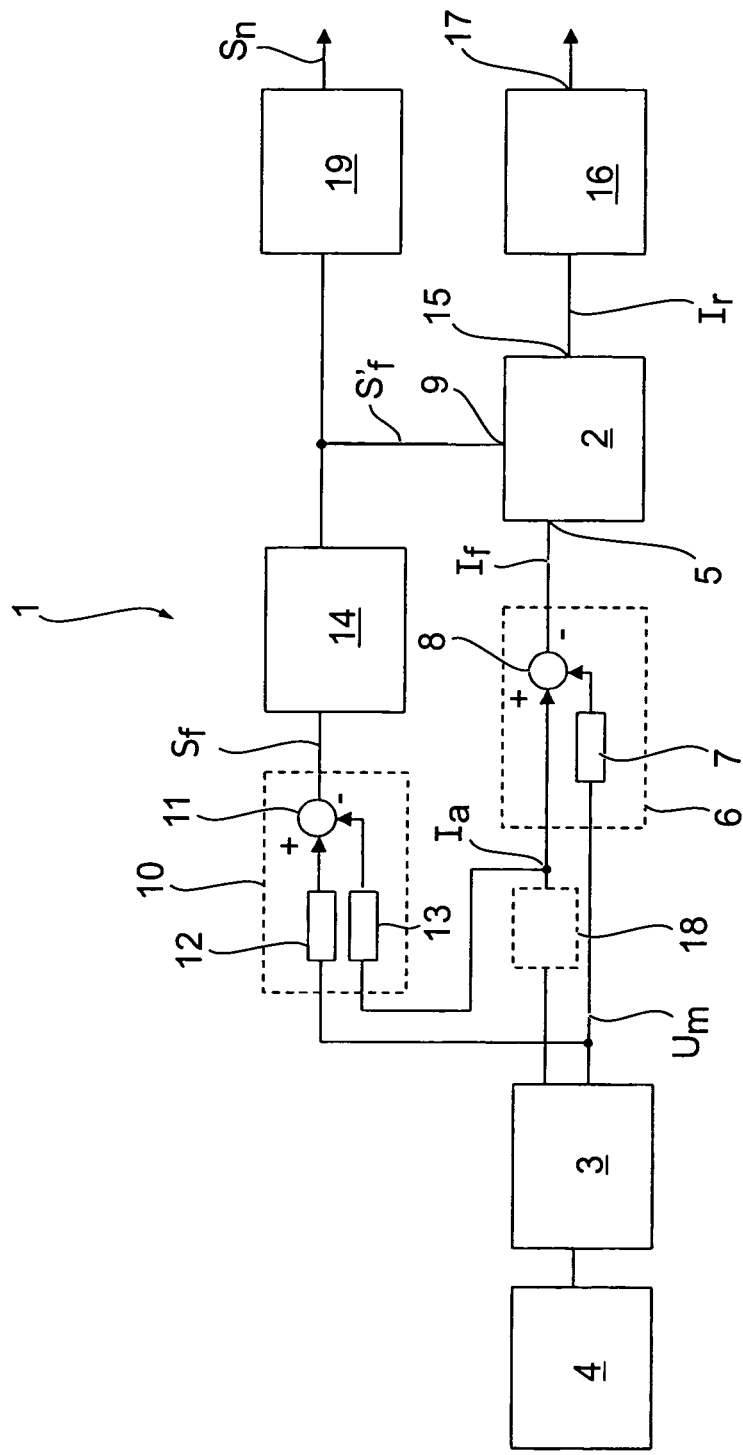
FIG. 1 shows a schematic of a block circuit diagram of the function blocks of an apparatus for processing an armature current signal by means of a controllable frequency filter.

The block circuit diagram illustrated in FIG. 1 represents the functionality of a method and of an apparatus for determining the current ripple generated in an armature current signal $I_a$ of a DC motor as a result of the commutation thereof. This current ripple is superimposed as an AC signal component on the DC current signal of the DC motor. Since the number of commutator laminates of the DC motor is known, it is possible to determine the motor speed and the position of the motor armature (armature position) from the number of current ripple elements per unit time. The armature position in turn corresponds to the position of an adjustment element of a motor vehicle which is driven by the DC motor. Thus, it is possible using relatively simple means, for example, to determine the position of a window pane of a motor vehicle, which window pane is capable of being adjusted automatically by means of a window winder drive, along the adjustment path of said window pane between an upper, closed position and a lower, open position. The information used in the process from the back-emf can also be used for excess force limitation (EFL), in particular for realizing a simple and reliable anti-trap system.

The apparatus 1 comprises an adjustable frequency filter 2, preferably a tunable bandpass filter, and a measuring device 3 with means for detecting both the armature current and a corresponding armature current signal $I_a$ as well as a motor voltage signal (referred to below as motor voltage $U_m$) of a DC motor 4.

The frequency $f_{BW}$ of the adjustable bandpass filter is determined by the following relationship:

$$f_{BW} = n = k \cdot E \quad (1), \text{where}$$

$$E = U_m - R_a \cdot I_a \quad (2)$$

In this case, E is the back-emf, $U_m$ is the motor voltage, $R_a$ is the winding resistance of the armature winding of the DC motor, $I_a$ is the armature current, referred to below as the armature current signal, k is a motor constant, and n is the motor speed.

The following equation (3) describes the mathematical model of the DC motor.

$$U_m = R_a \cdot I_a + L_a \cdot \frac{dI_a}{dt} + E \quad (3)$$

In equation (3), the term $L_a \cdot I_a/dt$ indicates the self-induced voltage and E indicates the back-emf, where $L_a$ is the winding inductance of the armature winding.

From this, the armature current profile $I_a$ can be determined in accordance with the following equations (4) to (5), where s is the Laplace operator (Laplace transformation).

$$\frac{dI_a}{dt} = \frac{1}{L_a}(U_m - E - R_a \cdot I_a) \quad (4)$$

$$L_a \frac{dI_a}{dt} = (U_m - E) - R_a \cdot I_a \quad (4.1)$$

$$L_a \frac{dI_a}{dt} + R_a \cdot I_a = (U_m - E) \quad (4.2)$$

$$\frac{d}{dt} \Leftrightarrow s \quad (4.3)$$

$$\frac{dI_a}{dt} \Leftrightarrow sI_a \quad (4.4)$$

$$L_a s I_a + R_a \cdot I_a = (U_m - E) \quad (4.5)$$

$$(L_a s + R_a) \cdot I_a = (U_m - E) \quad (4.6)$$

$$I_a = \frac{1}{(L_a s + R_a)}(U_m - E) \quad (4.7)$$

$$I_a = \frac{1}{(R_a + L_a s)}(U_m - E) \quad (4.8)$$

$$I_a = \frac{1/R_a}{(1 + L_a/R_a * s)}(U_m - E) \quad (4.9)$$

$$I_a = \frac{1/R_a}{1 + sL_a/R_a}(U_m - E) \quad (5)$$

$$I_e = \frac{1/R_a}{(1 + sL_a/R_a)}(U_m) \quad (6)$$

$$I_f = I_a - I_e \quad (7)$$

Although in equation (5) the value of E (back-emf) is unknown, it is known that those current components which are obtained directly from the applied motor voltage $U_m$ are determined in accordance with the relationship according to equation (6).

It is possible to see from equation (6) that the applied motor voltage $U_m$, in the state of equilibrium, results in a signal profile (switching or inrush current signal) $I_e$, which is also referred to below as the correction signal, in accordance with the relationship $I_e = U_m/R_a$ with the (first-order) delay and the time constant $T_a = L_a/R_a$. This corresponds to the filter characteristic of a first-order low-pass filter.

In accordance with the relationship according to equation (7), a filter input signal $I_f$ can be determined by forming the difference, said filter input signal being supplied to a signal input 5 of the frequency filter 2. For this purpose, a (second) function module (function block) 6 with a multiplier 7 and with a subtraction stage 8 is arranged upstream of the frequency filter 2 on the signal input side. In the function module 6, the detected armature current signal $I_a$ is supplied directly to the subtraction stage 8 and the motor voltage $U_m$ is supplied to said subtraction stage via the multiplier 7, in which the measured motor voltage $U_m$ is weighted by the factor resulting from the equation (6).

$$A = \frac{1/R_a}{(1 + sL_a/R_a)}$$

Figure 2:
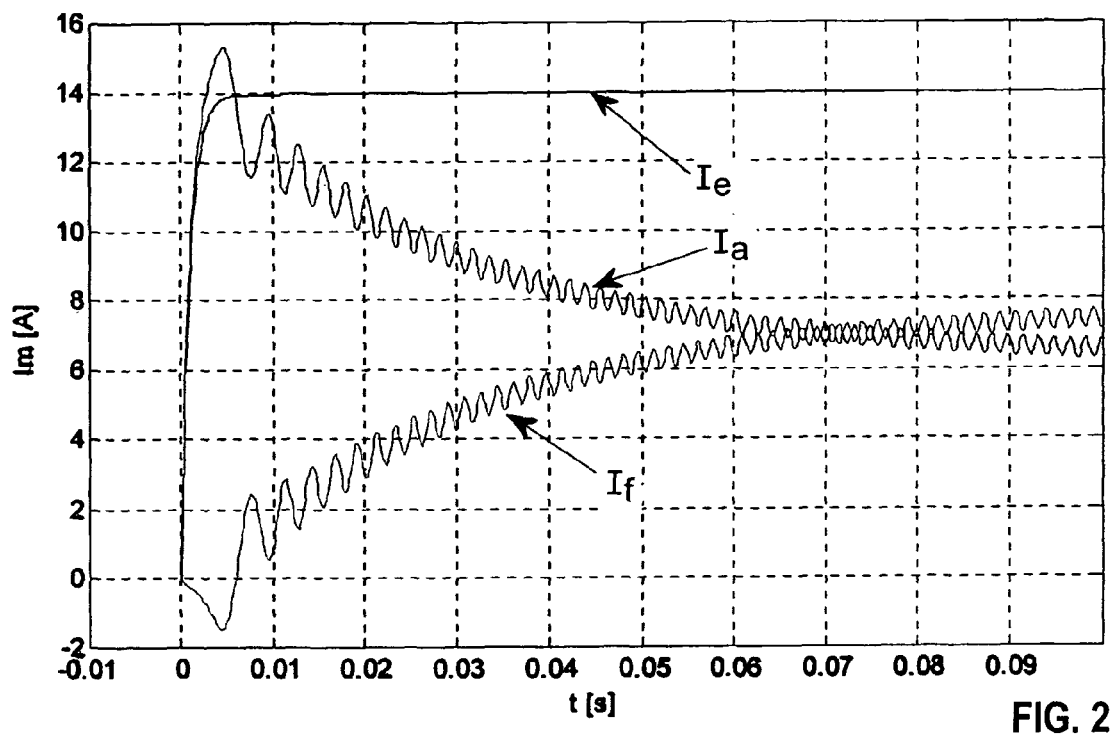
FIG. 2 shows the differential profile between the armature current signal and a correction profile with a low-pass filter characteristic in a current-time graph.
Figure 3:
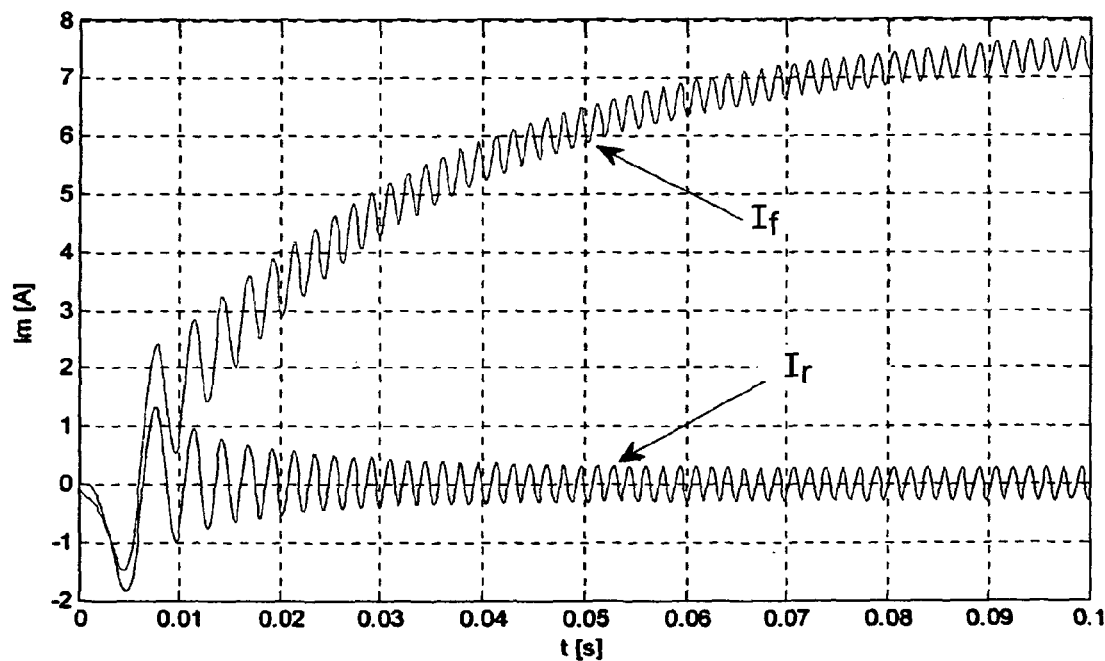
FIG. 3 shows a graph as shown in FIG. 2 showing the profile of the filter input signal and the filter output signal.

This term corresponds to a first-order low-pass filter or low-pass filter functionality and therefore forms a low-pass filter characteristic factor A. The weighted signal $A \cdot U_m$ is subtracted from the detected armature current signal $I_a$ in the subtraction stage 8 in accordance with equation (7). The differential signal $I_f$ whose typical profile is illustrated in FIGS. 2 and 3 is supplied to the frequency filter 2 in the form of a filter input signal $I_f$.

The useful signal or control signal $S_f$ (back-emf signal) supplied to a control input 9 of the filter module 2 for frequency determination or limit-frequency or mid-frequency adjustment thereof is determined in accordance with the relationship according to equations (1) to (2), in particular according to equation (3) converted for the back-emf E in accordance with the relationship $E=U_m-R_a \times I_a + L_a \times dI_a/dt$ by forming the difference in a further (first) function module 10, to which both the armature current signal $I_a$ and the motor voltage $U_m$ are likewise supplied.

In turn, the function module 10 comprises a subtraction stage 11. A respective multiplier 12, 13 is provided for multiplication both of the motor voltage $U_m$ by the factor p/K and of the armature current signal $I_a$ by the factors p/K or $p/k \cdot R_a$ in accordance with the relationships $S_f = f_{BW} = n \cdot p = k \cdot E$ and in analogy to equations (1) and (2) following $S_f = p/k \cdot U_m - p/k \cdot R_a \cdot I_a$. In this case, p is the number of poles or commutator laminates or slots of the motor 4.

Figure 4:
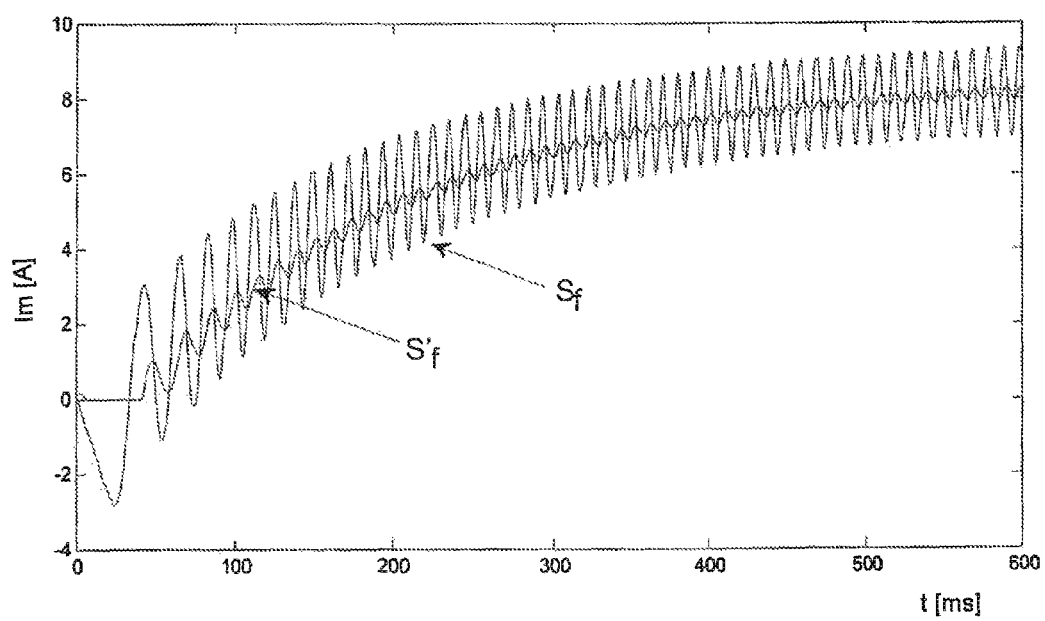
FIG. 4 shows a graph as shown in FIGS. 2 and 3 showing the profile of the unfiltered filter control signal and a filter control signal filtered using a low-pass filter.

The output signal $S_f$ which can be tapped off at this (first) function module 10 on the output side is illustrated in FIG. 4. This signal $S_f$ is supplied to a low-pass filter 14, which produces the control signal $S'_f$ (likewise illustrated in FIG. 4) on the output side. This control signal $S'_f$ filtered using a low-pass filter is supplied to the control input 9 of the filter module 2.

The speed-proportional output signal (ripple signal) $I_r$ which is generated as a result of the frequency filtering and can be tapped off at a signal output 15 of the frequency filter or bandpass filter 2 is illustrated in FIG. 2. In addition, FIG. 2 shows the filter input signal $I_f$ (also illustrated in FIG. 1), which is derived from the back-emf and in the process is filtered using a low-pass filter.

The current component in accordance with equation (7) is responsible for the motor rotation. It can be seen from equations (5) to (7) that the back-emf is unknown and therefore cannot be derived from equation (7). Therefore, the current component $I_s$ is proportional to the back-emf. This current component therefore does not contain any high-frequency inrush current peaks either which would make reliable filtering of the current ripple from the armature current signal $I_a$ extremely difficult or even impossible.

In addition, it can be seen that the component $I_f$ is zero virtually up to the point in time at which the DC motor 4 has overcome the static friction. This can likewise be seen in FIG. 1. This fact, and the fact that the motor voltage $U_m$ is contained in the filter input signal $I_f$ and therefore in the filter operation of the filter module 2, increases the accuracy of the so-called ripple counting. For this purpose, a function module (digitization module) 16 for digitizing the output signal $I_r$ is connected downstream of the filter module 2. The information relating to the (relative) position of an adjustment element of a motor vehicle can be tapped off at a counter output 17 on the output side at this digitization module 16.

The incorporation or consideration of the motor voltage $U_m$ in the filter input signal $I_f$, on the one hand, and in the control signal $S_f$ of the filter module 2, on the other hand, takes account of the important information relating to the switching state or switch-on state or other motor interference reflected in the motor voltage $U_m$.

The additional low-pass filtering of the useful signal or control signal $S_f$ determined in the (first) function module 10 avoids faulty matching of the filter frequency of the bandpass filter 2, with the result that virtually any existing current ripple is also detected. As a result of this low-pass filtering, the control frequency of the control signal $S_f$ is smoothed and the filter function of the bandpass filter 2 is stabilized.

Instead of a conventional bandpass filter functionality of the filter module 2, said filter module 2 can also be constructed with a high-pass filter and with a low-pass filter in such a way that the limit frequency of the high-pass filter functionality is virtually unchanged or static, while only the (upper) limit frequency of the low-pass filter characteristic is variable using the control signal $S'_f$. The filter module 2 therefore expediently has a combined adjustable low-pass filter and fixed high-pass filter.

The armature current signal $I_a$ is prefiltered in a low-pass filter (anti-aliasing filter), with the result that the high frequency components responsible for the alias effect are attenuated. A corresponding analog anti-aliasing filter 18 is arranged downstream of the measuring device 3, or integrated therein as shown in FIG. 5, and arranged upstream of the (second) function module 6 for further-processing the armature current signal $I_a$.

For conditioning of the signal (useful signal) $S_f$ for excess force limitation, in particular for use in an anti-trap system, this useful signal $S_f$ is supplied to a function module 19. A digital low-pass filter for suppressing the ripple contained in this signal $S_f$ of the DC motor 4 in addition to the high-frequency interference in the armature current signal $I_a$ and in the motor voltage $U_m$ is then realized by a separate filter module or integrated in the low-pass filter 14. As a result of subsequent differentiation of the back-emf by means of the corresponding function module 19, fluctuations in the back-emf E contained in the signal $S_f$ as a result of the AC component of the ripple are removed, with the result that a desired speed-proportional useful signal or EFL signal $S_n$ for EFL evaluation can be tapped off at the function module 19 on the output side.

Owing to the calculation of the back-emf E, it is therefore possible to derive a speed-proportional signal from the armature current signal $I_a$, it being possible for said speed-proportional signal to be used firstly for comparatively precise filtering of the current ripple $I_r$ to be detected for position sensing by a correspondingly optimum adjustment of the filter frequency of the filter module 2. Secondly, this signal $S_f$ can be used as a useful signal for a speed-based EFL system which already exists, for example. As a result, the computation complexity of a system with ripple-based position sensing and, used in parallel with this, speed-based EFL system is considerably reduced. As a result, existing speed-based EFL systems can be converted in a simple manner to systems in which there is current evaluation.

Figure 5:
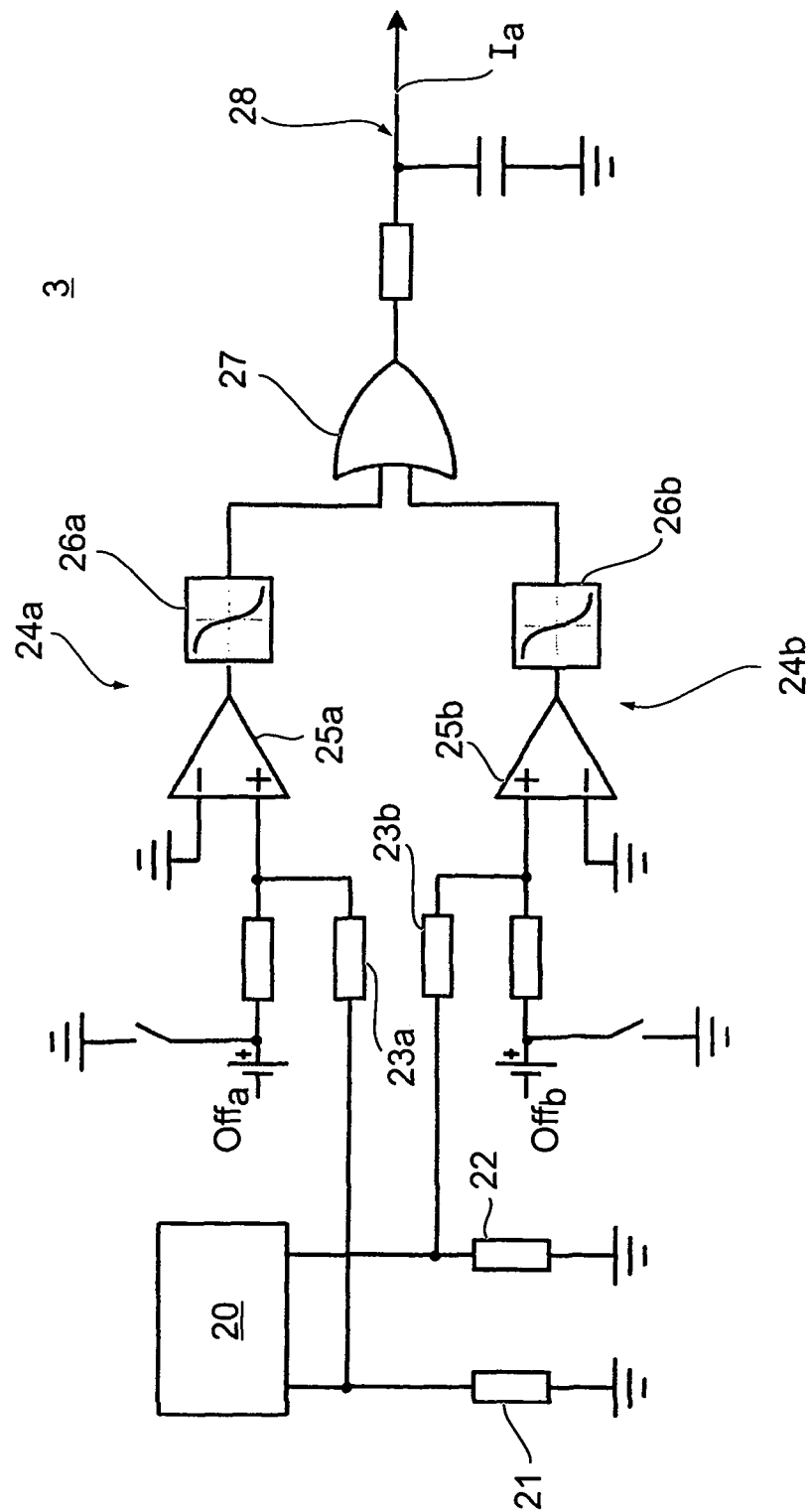
FIG. 5 shows a block circuit diagram of a measuring device for detecting and preprocessing a motor or armature current signal.

FIG. 5 shows a block circuit diagram of a measuring device 3 for conditioning the armature current signal $I_a$ of the DC motor 4. In principle, in this case the armature current $I_a$ is detected by means of a double relay 20 and two current measuring resistors (shunts) 21 and 22. Two active filters (filter modules) 24a and 24b are arranged downstream of said current measuring resistors via a respective decoupling resistor 23a or 23b. The active filters 24a and 24b each comprise an operational amplifier 25a, 25b with a low-pass filter 26a and 26b, respectively, connected downstream. The circuitry principle is that of a filter with multiple negative feedback.

The two filters or filter modules 24a, 24b form two measurement channels or input channels connected in parallel and can be adapted to a specific frequency and a specific gain by virtue of the dimensions of the component parts thereof. The filters or input channels 24a, 24b which are thus connected in parallel are logically combined with one another via an OR gate 27. This results in an arrangement with two input channels and a single output channel 28 for the armature current signal $I_a$.

An offset $Off_a$, $Off_b$ which, to a large extent, can be as desired can be coupled into each of the two input channels. By using two additional digital IOs of a microcontroller, it is possible for each of the two offsets $Off_a$, $Off_b$ to be set to "zero" again.

Overall, the measuring device 3 is therefore a combined amplifier circuit with two active filters 24a, 24b in the basic circuit illustrated. Offsets $Off_a$ and $Off_b$ can be coupled into the input channels 24a, 24b, respectively, and disconnected again.

Owing to the analogous combination of the input channels (input-side measurement channels or paths) 24a, 24b, the two measurement paths can be evaluated at an AD converter input of the microcontroller. As a result of the reduced number of converter channels, an increased sampling rate of the measured or armature current signal $I_a$ is thus possible. Owing to the use of an active filter, a filter response with a higher order and with a relatively low degree of complexity in terms of component parts and with at the same time amplification of the armature current signal $I_a$ is enabled.

Owing to the system, although each of the individual input channels 24a and 24b is sufficient for illustrating the armature current in all states, it is also possible for negative currents to occur in the generator mode of the motor. In order to be able to detect these states via the measurement circuit illustrated of the measuring apparatus 3, the offsets $Off_a$, $Off_b$ are coupled in at the inputs. Although the two amplifier modules 25a, 25b are connected in parallel, the armature current signal $I_a$ can be tapped off in the form of two discrete channels and processed. In this case, however, the measurement should be performed physically at a different point.

Since, in the measurement system of the measuring apparatus 3 illustrated, in each case only one of the two input paths 24a, 24b can have a valid signal, the input which is not used is switched so as to be inactive with the aid of a pin of the microcontroller. Owing to the use of any desired offset $Off_a$, $Off_b$ in the measured value, any desired negative current can thus be measured and, in turn, the current value or current profile passed over one of the two input channels 24a, 24b can optionally be measured at only one output channel 28.

In order to process a motor signal $I_a$, $U_m$ of a DC motor 4, in particular of an adjustment drive of a motor vehicle, in accordance with the invention the armature current $I_a$ and the motor voltage $U_m$ of the DC motor 4 are detected and used for determining the back-emf E of the DC motor 4. The determined back-emf E is used to generate a useful signal $S_f$, $S'_f$ and/or $S_n$, which is in particular speed-proportional, from the armature current signal $I_a$ for position sensing or for evaluating an excess force limitation.

LIST OF REFERENCE SYMBOLS

1 Apparatus
2 Bandpass/frequency filter
3 Measuring device
4 DC motor
5 Signal input
6 (Second) function module
7 Multiplier
8 Subtraction stage
9 Control input
10 (First) function module
11 Subtraction stage
12 Multiplier
13 Multiplier
14 Low-pass filter
15 Signal output
16 Function/digitization module
17 Counter output
18 Low-pass/anti-aliasing filter
19 Function module
20 Double relay
21 Current measuring resistor/shunt
22 Current measuring resistor/shunt
23a,b Decoupling resistor
24a,b Filter/input channel
25a,b Operational amplifier
26a,b Low-pass filter
27 OR gate
28 Output channel
$I_a$ Armature current/signal $I_f$ Filter
$I_r$ Filter output signal
$S_f$ Control/useful signal
$S'_f$ Control signal
$S_n$ Useful/EFL signal
$U_m$ Motor voltage/voltage signal

The invention claimed is:

1. An apparatus (1) for processing an armature current signal ($I_a$) of a DC motor (4), the apparatus comprising:
    a measuring device (3) adapted to detect an armature current signal ($I_a$) and a motor voltage signal ($U_m$) of the DC motor;
    a first function module (10) adapted to determine a back-emf signal ($S_f$) of the DC motor (4); and
    a controllable frequency filter (2) comprising a control input (9), a signal input (5), and a signal output (15), wherein:
        a control signal ($S'_f$) based on the back-emf signal ($S_f$) is passed to the control input (9);
        a filter input signal ($I_f$), which is derived from the armature current signal ($I_a$) and the motor voltage signal ($U_m$) is passed to the signal input (5); and
        an output signal ($I_r$), which is generated using a current ripple contained in the filter input signal ($I_f$) is adapted to be tapped off at the signal output (15).

2. The apparatus (1) as claimed in claim 1, further comprising a second function module (6), having an output side connected to the signal input (5) of the frequency filter (2), wherein the second function module is adapted to generate the filter input signal ($I_f$).

3. The apparatus (1) as claimed in claim 2, wherein the second function module (6) generates the filter input signal ($I_f$) as a current signal which is proportional to the back-emf signal ($S_f$).

4. The apparatus (1) as claimed in claim 2, wherein the second function module (6) functions as a subtraction stage (8) adapted to determine a difference between the armature current signal ($I_a$) and a correction signal ($I_e$), wherein the subtraction stage has a low-pass filter characteristic.

5. The apparatus (1) as claimed in claim 2, wherein the second function module (6) functions as a multiplier in accordance with a relationship $I_e = A \cdot U_m$, where $A = R_a^{-1}/(1+s L_a R_a^{-1})$ corresponds to a first-order low-pass filter function, s is a time derivative of the armature current signal ($dI_a/dt$), $R_a$ is a nonreactive winding resistance of the DC motor (4), and $L_a$ is a winding inductance of the DC motor (4).

6. The apparatus (1) as claimed in claim 1, wherein the measuring device (3) has (i) two current detection elements (21, 22) and (ii) an active filter comprising (a) two input channels (24a, 24b) for the armature current signal ($I_a$) and (b) an output channel (28).

7. The apparatus (1) as claimed in claim 6, wherein the two input channels (24a, 24b) are logically combined, via a logic OR gate (27), with said two input channels being passed into the output channel (28) via the logic combination.

8. The apparatus (1) as claimed in claim 1, wherein the control signal ($S'_f$) is generated by applying the back-emf signal ($S_f$) to a low-pass filter (14) connected downstream of the first function module (10).

9. The apparatus (1) as claimed in claim 1, wherein the DC motor (4) is part of an adjustment drive of a motor vehicle.

10. A method for processing motor signals ($I_a$, $U_m$) of a DC motor (4), the method comprising:
  (a) detecting an armature current signal ($I_a$) and a motor voltage signal ($U_m$) of the DC motor (4);
  (b) determining a back-emf signal ($S_f$) of the DC motor (4) based on the armature current signal and the motor voltage signal;
  (c) generating a filter control signal ($S'_f$) from the back-emf signal ($S_f$);
  (d) generating a correction signal ($I_e$) by weighting the motor voltage signal($U_m$) with a low-pass filter characteristic factor (A);
  (e) generating a filter input signal ($I_f$) from a difference between the armature current signal ($I_a$) and the correction signal ($I_e$);
  (f) controlling frequency of a controllable frequency filter (2) based on the filter control signal ($S'_f$); and
  (g) applying the filter input signal ($I_f$) to the controllable frequency filter (2) to generate a speed-proportional signal ($I_r$).

11. The method as claimed in claim 10, wherein the armature current signal ($I_a$) is generated using two current detection elements (21, 22) connected to a filter module comprising two input channels (24a, 24b) and an output channel (28).

12. The method as claimed in claim 11, wherein the two input channels (24a, 24b) are formed from two filters, which are at least one of (i) connected in parallel and (ii) active.

13. The method as claimed in claim 10, wherein the back-emf signal ($S_f$) is determined from the motor voltage signal ($U_m$) and a product of the armature current signal ($I_a$) and an armature resistance ($R_a$).

14. The method as claimed in claim 10, wherein the filter control signal ($S'_f$)is generated by applying the back-emf signal ($S_f$) to a low-pass filter (14).

15. The method as claimed in claim 10, wherein the armature current signal ($I_a$) is prefiltered in a low-pass filter (18).

16. The method as claimed in claim 10, wherein the DC motor (4) is part of an adjustment drive of a motor vehicle.

17. A method for processing a motor signal ($I_a$, $U_m$) of a DC motor (4), the method comprising:
  (a) detecting an armature current signal ($I_a$) and a motor voltage signal ($U_m$) of the DC motor (4);
  (b) determining a back-emf signal ($S_f$) of the DC motor (4) based on the armature current signal and the motor voltage signal; and
  (c) using the determined back-emf signal ($S_f$) to generate a useful signal ($S'_f$, $S_{EFL}$), which is speed-proportional, from the armature current signal ($I_a$), wherein the armature current signal ($I_a$) is detected by two current detection elements (21, 22) and is supplied to a filter module comprising two input channels (24a, 24b) and an output channel (28).

18. The method as claimed in claim 17, wherein the two input channels (24a, 24b) are formed from two filters, which are at least one of (i) connected in parallel and (ii) active.

19. An apparatus (1) for processing an armature current signal ($I_a$) of a DC motor (4), the apparatus comprising:
  a measuring device (3) adapted to detect an armature current signal ($I_a$) and a motor voltage signal ($U_m$) of the DC motor (4); and
  a first function module (10) for determining a useful signal ($S'_f$), which is speed-proportional, from a back-emf signal ($S_f$) of the DC motor (4), wherein:
    the measuring device (3) has (i) two current detection elements (21, 22) and (ii) an active filter comprising (a) two input channels (24a, 24b) for the armature current signal ($I_a$) and (b) an output channel (28).

20. The apparatus (1) as claimed in claim 19, wherein the two input channels (24a, 24b) are logically combined, via a logic OR gate (27), with said two input channels being passed into the output channel (28) via the logic combination.

21. A method for processing a motor signal ($I_a$, $U_m$) of a DC motor (4), the method comprising:
  (a) detecting an armature current signal ($I_a$) and a motor voltage signal ($U_m$) of the DC motor (4);
  (b) determining a back-emf signal ($S_f$) of the DC motor (4) based on the armature current signal and the motor voltage signal; and
  (c) using the determined back-emf signal ($S_f$) to generate a useful signal ($S'_f$, $S_{EFL}$), which is speed-proportional, from the armature current signal ($I_a$), wherein:
    the back-emf signal ($S_f$) is determined from the motor voltage signal ($U_m$) and a product of the armature current signal ($I_a$) and an armature resistance ($R_a$); and
    the motor voltage signal ($U_m$) is weighted with a low-pass filter characteristic factor (A) and a correction signal ($I_e$) is derived therefrom, a filter input signal ($I_f$) being generated from a difference between the armature current signal ($I_a$) and the correction signal ($I_e$).

* * * * *